(12) United States Patent
Mahieu et al.

(10) Patent No.: US 10,130,039 B2
(45) Date of Patent: Nov. 20, 2018

(54) AGRICULTURAL HARVESTER INCLUDING FEEDBACK CONTROL OF CHOPPING PARAMETERS

(71) Applicant: CNH Industrial America LLC, New Holland, PA (US)

(72) Inventors: Thomas Mahieu, Ypres (BE); Bart M. A. Missotten, Herent (BE); Bart Lenaerts, Zutendaal (BE); Frederik Tallir, Esen (BE); Pieter Van Overschelde, Sint-Andries (BE); Tom N. N. Somers, Aalter (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/248,866

(22) Filed: Aug. 26, 2016

(65) Prior Publication Data
US 2017/0055445 A1    Mar. 2, 2017

(30) Foreign Application Priority Data
Aug. 28, 2015   (BE) .................................. 2015/5548

(51) Int. Cl.
*G06F 7/70* (2006.01)
*A01F 12/40* (2006.01)

(52) U.S. Cl.
CPC .................................. *A01F 12/40* (2013.01)

(58) Field of Classification Search
CPC .. A01D 41/1274; A01D 41/1243; A01F 12/40
See application file for complete search history.

(56) References Cited

U.S. PATENT DOCUMENTS

| 2,064,689 A | 12/1936 | Russwurm et al. |
| 2,842,175 A | 7/1958 | Thompson |
| 2,961,024 A | 11/1960 | Urschel et al. |
(Continued)

FOREIGN PATENT DOCUMENTS

| DE | 1896312 | 7/1964 |
| DE | 1295913 | 5/1969 |
(Continued)

OTHER PUBLICATIONS

European Search Report; 16186179.4-1656; dated Feb. 3, 2017.

*Primary Examiner* — Huessein Elchanti
(74) *Attorney, Agent, or Firm* — Peter K. Zacharias; Patrick M. Sheldrake

(57) ABSTRACT

An agricultural harvester for harvesting a crop on a field. The harvester includes a chopping assembly configured to chop a crop residue of the harvested crop. The chopping assembly includes an inlet for receiving the crop residue, a rotor provided with one or more cutting tools and configured to chop the crop residue, a drive assembly configured to drive the rotor, and an outlet for outputting the chopped crop residue onto the field. The harvester further includes an image based sensor configured to generate a signal comprising an image of the chopped crop residue and a processing unit configured to receive the signal from the image based sensor, process the signal to derive a geometric parameter indicative of a geometry of the chopped crop residue, and determine a control signal for the drive assembly based on the geometric parameter.

20 Claims, 3 Drawing Sheets

(56) References Cited

U.S. PATENT DOCUMENTS

| | | |
|---|---|---|
| 3,350,017 A | 10/1967 | Howell et al. |
| 3,566,943 A | 3/1971 | Witt |
| 3,827,642 A | 8/1974 | Sageman |
| 3,874,604 A | 4/1975 | Gronberg et al. |
| 4,087,051 A | 5/1978 | Moeller |
| 4,383,652 A | 5/1983 | Osborne et al. |
| 4,505,434 A | 3/1985 | Martenas et al. |
| 4,612,941 A | 9/1986 | Kunde |
| 4,619,413 A | 10/1986 | Wistuba |
| 4,732,332 A | 3/1988 | Schitemaker |
| 4,998,679 A | 3/1991 | Bender |
| 5,042,973 A | 8/1991 | Hammarstrand |
| 5,368,238 A | 11/1994 | Bergkamp et al. |
| 5,529,254 A | 6/1996 | McIntyre et al. |
| 5,553,937 A | 9/1996 | Faccia |
| 5,687,921 A | 11/1997 | Moreels |
| 5,833,533 A | 11/1998 | Roberg |
| 5,911,372 A | 6/1999 | Williams, Jr. |
| 5,928,080 A | 7/1999 | Jakobi |
| 5,967,433 A | 10/1999 | O'Neill et al. |
| 5,974,776 A | 11/1999 | Prellwitz |
| 6,120,373 A | 9/2000 | Schrattenecker |
| 6,152,820 A | 11/2000 | Heidjann et al. |
| 6,231,439 B1 | 5/2001 | Heidjann |
| 6,251,009 B1 | 6/2001 | Grywacheski et al. |
| 6,354,938 B1 | 3/2002 | Schrattenecker |
| 6,431,981 B1 | 8/2002 | Shinners et al. |
| 6,688,972 B2 | 2/2004 | Buermann et al. |
| 6,769,239 B1 | 8/2004 | Webb |
| 6,912,835 B1 | 7/2005 | Chabassier |
| 7,220,179 B2 | 5/2007 | Redekop et al. |
| 7,455,584 B2 | 11/2008 | Farley et al. |
| 7,467,997 B2 | 12/2008 | Niermann et al. |
| 7,510,472 B1 | 3/2009 | Farley et al. |
| 7,544,127 B2 | 6/2009 | Dow et al. |
| 7,862,413 B2 | 1/2011 | Isaac et al. |
| 7,993,187 B2 | 8/2011 | Ricketts et al. |
| 8,375,826 B1 | 2/2013 | Farley et al. |
| 8,920,227 B2 | 12/2014 | Murray et al. |
| 2002/0106108 A1* | 8/2002 | Benson ............... A01B 69/001 382/104 |
| 2002/0119809 A1 | 8/2002 | Bognar et al. |
| 2003/0190939 A1 | 10/2003 | Bueermann |
| 2004/0093841 A1 | 5/2004 | Clauss |
| 2004/0182061 A1 | 9/2004 | Pirro et al. |
| 2005/0059445 A1 | 3/2005 | Niermann et al. |
| 2006/0191251 A1 | 8/2006 | Pirro et al. |
| 2006/0213167 A1* | 9/2006 | Koselka ............... A01D 46/30 56/10.2 A |
| 2007/0271013 A1* | 11/2007 | Jochem ............... A01B 69/001 701/28 |
| 2008/0028737 A1 | 2/2008 | Viaud et al. |
| 2008/0028738 A1 | 2/2008 | Viaud |
| 2008/0305842 A1 | 12/2008 | Benes et al. |
| 2010/0229520 A1 | 9/2010 | Lauwers et al. |
| 2010/0291982 A1 | 11/2010 | Isaac et al. |
| 2012/0056024 A1 | 3/2012 | Isaac et al. |
| 2012/0123650 A1* | 5/2012 | Diekhans ............ A01D 43/085 701/50 |
| 2013/0042591 A1 | 2/2013 | Behnke et al. |
| 2013/0104453 A1* | 5/2013 | Hassle ................. A01G 9/14 47/17 |
| 2015/0038201 A1 | 2/2015 | Brinkmann et al. |
| 2015/0089867 A1* | 4/2015 | Abbott ................. A01G 9/00 47/58.1 LS |
| 2016/0084813 A1* | 3/2016 | Anderson ........... A01D 41/127 702/5 |
| 2016/0150733 A1* | 6/2016 | Missotten ........... A01D 43/087 701/50 |
| 2017/0118925 A1* | 5/2017 | Noguchi .............. A01G 9/247 |

FOREIGN PATENT DOCUMENTS

| | | |
|---|---|---|
| EP | 0538599 | 4/1993 |
| EP | 2436258 A1 | 4/2012 |
| GB | 1009610 | 11/1965 |
| JP | 2004313068 A | 11/2004 |

* cited by examiner

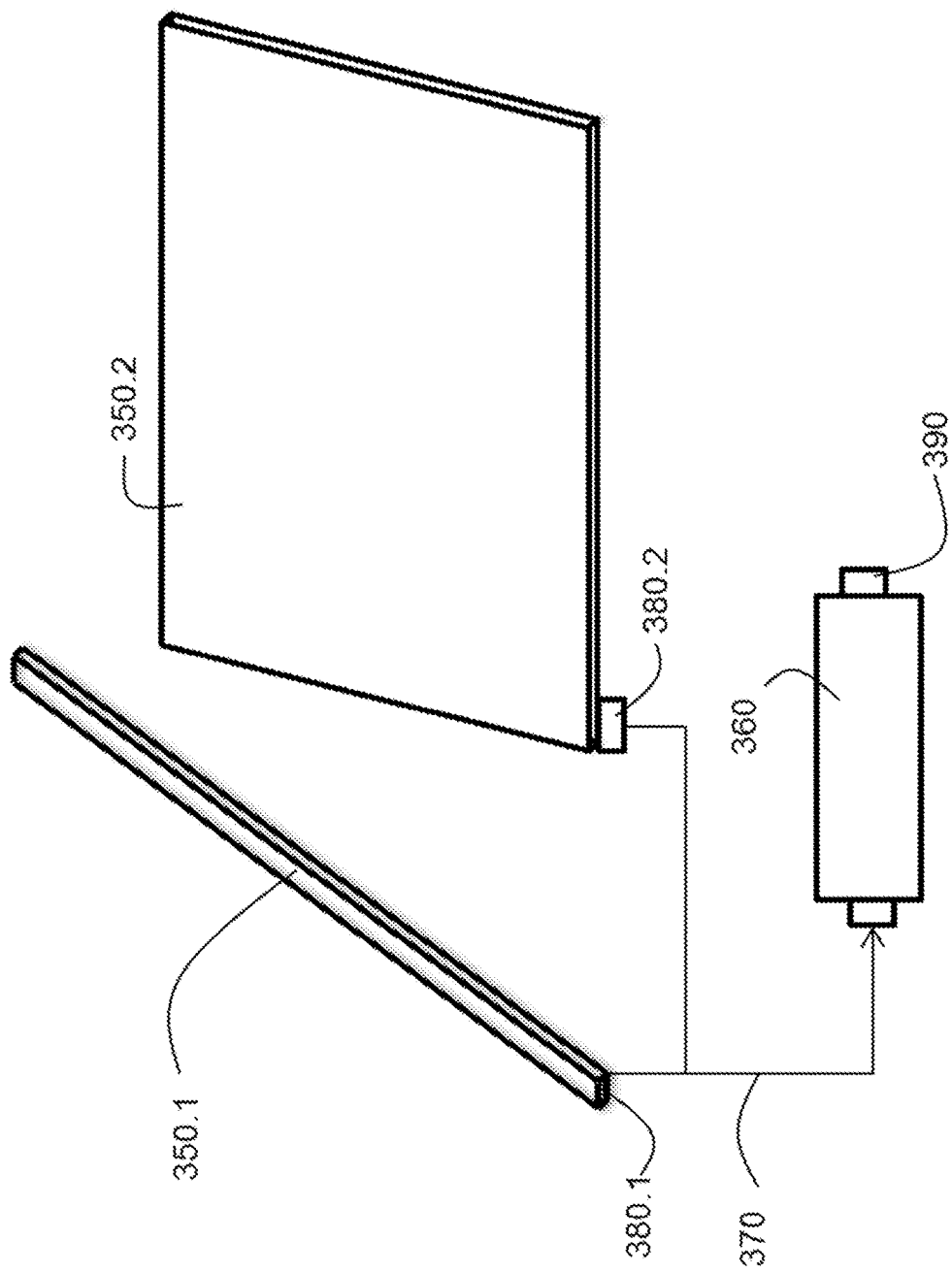

AGRICULTURAL HARVESTER INCLUDING FEEDBACK CONTROL OF CHOPPING PARAMETERS

FIELD OF THE INVENTION

The invention relates to the field of agricultural harvesters such as combines which including a chopper, e.g. for chopping the non-grain material such as straw, and more specifically to the assessment of a geometrical parameter of the chopped straw and an adjusting of an operating parameter of the harvester based on the assessment.

BACKGROUND OF THE INVENTION

An agricultural harvester, also referred to as a combine or combine harvester because it typically combines multiple harvesting functions, typically includes a header for removing a crop from a field and a so-called threshing tool for performing a threshing operation on the crop in order to separate the grain from the non-grain material such as straw. The non-grain material may subsequently be transported from the threshing tool to a residue processing tool such as a chopper, e.g. a straw chopper. Such a residue processing tool typically reduces the size of the non-grain material and direct it out of the rear of the combine. This chopped non-grain material or chopped crop residue typically remains on the field and serves to fertilize the field. In order to do so, it is important that the size of the chopped crop residue particles as outputted on the field is sufficiently small. At present, the quality of the chopped crop residue, in particular the size or length of the chopped crop residue, is typically checked manually by the operator of the harvester, whereupon, when needed, operating parameters of the residue processing tool may be adjusted. This is typically done once a day or even less. Because crop conditions may vary significantly over time or may be location dependent, the quality of the chopped crop residue may vary significantly as well. Therefore, in order to maintain a good quality of the chopped crop residue, the operator should preferably check the quality of the chopped crop residue more often, resulting in a more time consuming harvesting process. As such, there is a need to provide in an alternative way of assessing the quality of the chopped crop residue that is less time consuming.

SUMMARY OF THE INVENTION

It would be desirable to provide in an agricultural harvester which enables an assessment of the quality of the chopped crop residue in a more efficient manner, i.e. a manner that is less time-consuming. It would also be desirable to provide in such a quality assessment at a sufficiently high frequency, in order to anticipate to changing crop parameters or crop conditions, thus enabling to maintain a desired quality of the chopped crop residue.

To better address one or more of these concerns, in a first aspect of the invention, there is provided an agricultural harvester for harvesting a crop on a field, the harvester comprising:

a chopping assembly configured to chop a crop residue of the harvested crop, the chopping assembly comprising:
  an inlet for receiving the crop residue;
  a rotor provided with one or more cutting tools and configured to chop the crop residue;
  a drive assembly configured to drive the rotor;
  an outlet for outputting the chopped crop residue onto the field;
  an image based sensor configured to monitor the chopped crop residue, thereby generating a signal representative of a geometric parameter of a geometry of the chopped crop residue;
  a processing unit configured to:
    receive the signal of the image based sensor and process the signal to derive the geometric parameter therefrom; and
    determine a control signal for the drive assembly, based on the geometric parameter.

In accordance with the present invention, an agricultural harvester is provided. The agricultural harvester can e.g. be configured to harvest grain as a crop, whereby straw can be considered a crop residue, although other crops may be considered as well. In the harvester according to the present invention, the crop residue is processed by a chopping assembly and subsequently outputted onto the field. It is desirable that the crop residue which is processed by the chopping assembly (i.e. the chopped crop residue) meets certain quality standards. In particular, the purpose of the outputted chopped crop residue may serve as fertilizer for the soil and as such, the chopped crop residue should be sufficiently small. In order to reduce the size of the crop residue, the chopping assembly comprises a rotor provided with one or more cutting tools such as blades or knifes. The rotor of the chopping assembly as applied in the agricultural harvester according to the present invention is driven by a drive assembly, e.g. be a variable speed drive (VSD), e.g. including a variator or a CVT (continuously variable transmission).

Depending on the chopping effort that is made, the power consumption of the chopping assembly, in particular of the drive assembly driving the rotor, may be comparatively high, in particular when the crop residue is chopped in comparatively small segments. As such, it may be advantageous to ensure that the chopped crop residue is sufficiently small but not too small. In order to realize, it is proposed in the present invention, to monitor a geometric parameter of the chopped crop residue, by means of an image based sensor, and adjust, when required, an operating parameter of the chopping assembly, in particular an operating parameter of the rotor or stator of the chopping assembly. As such, the chopping assembly of the present invention comprises an image based sensor for monitoring the chopped crop residue and generating a signal, e.g. comprising a one-dimensional or two-dimensional image of the chopped crop residue and provide the signal to a processing unit for processing. Such a processing unit may e.g. comprise a microprocessor, a microcontroller, a computer or the like for processing the image and generating a control signal for the drive assembly.

Typically, the processing unit may comprise an input terminal for receiving the signal and an output terminal for outputting the control signal. In accordance with the present invention, the processing unit is configured to process the signal as received to derive a geometric parameter indicative of a geometry of the chopped crop residue. Such geometric parameter could be the length of the residue particles or the indication/measurement of how many (e.g. a % level) of the stems have been splitted over the length or not. Such processing may e.g. include the use of one or more pattern recognition or shape measurement algorithms. Other derived parameters, such as texture could also be employed. Based upon the geometric parameter as derived, the processing unit may output the control signal for adjusting the chopping assembly accordingly to optimize particle size and power consumption.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 3 depicts two embodiments of image based sensors and a processing unit as can be applied in a combine harvester according to the present invention.

DETAILED DESCRIPTION OF EMBODIMENTS

Figure 1:
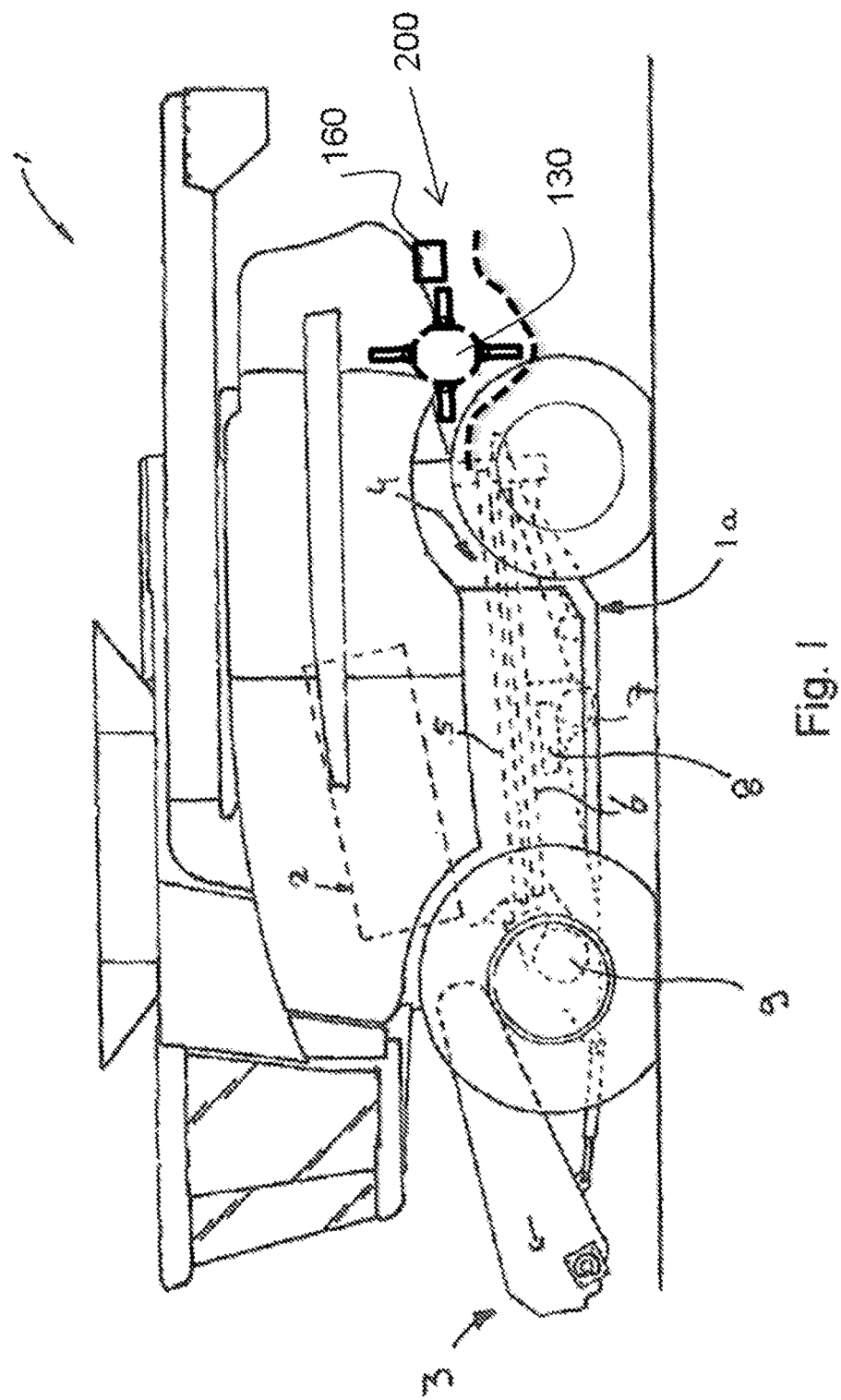
FIG. 1 depicts a cross-sectional view of an agricultural harvester according to the present invention.

FIG. 1 depicts a cross-sectional view of an agricultural harvester 1 according to the present invention.

The agricultural harvester 1 can e.g. be configured to harvest grain as a crop, whereby straw can be considered a crop residue. In the harvester according to the present invention, this crop residue is processed by a chopping assembly and subsequently outputted onto the field. It is desirable that the crop residue which is processed by the chopping assembly (i.e. the chopped crop residue) meets certain quality standard. In particular, the purpose of the outputted chopped crop residue may serve as fertilizer for the soil and as such, the chopped crop residue should be sufficiently small. At the same time, one should realize that the power consumption of the chopping assembly depends on the chopping effort that is made. As such, when the crop residue is chopped in comparatively small segments, the power consumption of the chopping assembly may be comparatively high. As such, it may be advantageous to ensure that the chopped crop residue is sufficiently small but not too small. In order to realize, it is proposed in the present invention, to monitor a geometric parameter of the chopped crop residue and adjust, when required, an operating parameter of the chopping assembly, in particular an operating parameter of the rotor of the chopping assembly.

The agricultural harvester 1 as schematically shown in FIG. 1 comprises a header 3 or harvesting mechanism for cutting a crop on a field. The cut crop is subsequently transported, e.g. by means of one or more augers or one or more conveyors to a threshing mechanism or thresher 2 configured to separate the cut crop into a first stream, substantially composed of grain and chaff and a second stream, referred to as the crop residue, substantially composed of straw. The first stream may e.g. be conveyed via a grain pan to a cleaning mechanism 4, e.g. including one or more sieves 5, 6, driven by a drive assembly 8. The fine material, e.g. grain, that is collected below the sieves is transported by means of an auger 7, e.g. to an elevator. The second stream is conveyed to an inlet of a chopping assembly 200 in order to be chopped. The chopping assembly 200, which is explained in more detail below, includes a rotor or drum 130 provided with one or more cutting tools such as knifes or blades. During operation, the rotor or drum 130 rotates and cuts the crop residue. The cut crop residue is subsequently outputted, via an outlet of the chopping assembly 200, onto the field. In an embodiment, the outlet may e.g. comprise a spreader board to provide a substantially uniform distribution of the cut crop residue onto the field.

In accordance with the present invention, the chopping assembly further comprises a drive assembly configured to drive the rotor or drum. In an embodiment, the drive assembly may include a belt drive. In an embodiment, the belt drive may be a variable speed belt drive, e.g. including a variator or a CVT (continuously variable transmission).

The agricultural harvester according to the present invention further comprises an image based sensor 160 configured to monitor the chopped crop residue. In an embodiment, the image based sensor 160 may e.g. include a CCD camera or a CMOS type camera.

In an embodiment, the image based sensor includes a linear CCD or CMOS type camera, whereby the linear camera spans a substantial part of the width of the outlet of the chopping assembly. In an embodiment, a CCD or CMOS (line-scan-) camera can be mounted at the inlet as well as at the outlet of the chopping assembly. By comparing the residue at the inlet of the chopper with the residue at the outlet of the chopper or chopping assembly, it may be more convenient to identify the necessary actions for the chopping assembly in order to move in a desired direction of chop quality and power consumption.

In accordance with the present invention, the image based sensor is configured to output a signal (e.g. a one- or two-dimensional image) and provide the signal to a processing unit of the harvester, the signal representative of a geometric parameter of a geometry of the chopped crop residue. Such a processing unit may e.g. include a processor or microprocessor for processing the signal. The processing unit may further comprise an input terminal for receiving the signal.

It should be noted that the signal of the image based sensor, also referred to as the image sensor signal, may be communicated to the processing unit in various ways, include both wired or wireless modes of communication. In accordance with the present invention, the processing unit is configured to receive and process the image sensor signal to derive a geometric parameter indicative of a geometry of the chopped crop residue. As an example of such a geometric parameter, the length of the chopped crop residue may be mentioned. As such, in an embodiment, the processing unit may be configured to process the signal of the image based sensor to arrive at a value for the length of the chopped crop residue, said value e.g. being the mean or other metric of the geometric parameter distribution of the chopped crop residue.

Alternatively, or in addition, the processing unit may be configured to determine a length distribution enabling to determining whether a sufficient percentage of the chopped crop residue has a length within a desired range.

In accordance with the present invention, the geometric parameter is subsequently used by the processing unit to determine a control signal for the drive assembly.

As an example, when an average length of the chopped crop residue is determined, the processing unit may be configured to compare the average value with a desired or minimum value and, based upon the comparison, determine a control signal for the drive assembly.

It has been devised by the inventors, that the rotary speed of the rotor or drum of the chopping assembly has a substantial impact on the length of the chopped crop residue. As such, in case the geometric parameter as determined, e.g. the average length of the chopped crop residue, is lower than desired, the processing unit may output, e.g. via an output terminal of the processing unit, a control signal to the drive assembly, in order to increase the speed of the rotor.

In an embodiment of the present invention, the processing unit is configured to compare the geometric parameter as derived from the image sensor signal with a desired value of the geometric parameter. The desired value of the geometric parameter may e.g. include one or more of the following:

a minimum required length of the chopped crop residue;
a maximum length of the chopped crop residue;
a desired range for the length of the chopped crop residue.

As already indicated above, it may be desirable to adjust, i.e. reduce, the rotational speed of the rotor when the length of the chopped crop residue is too small, i.e. well below the maximum length. By doing so, the power consumption of the chopping assembly, in particular the power consumption of the drive assembly of the rotor, may be optimized.

Figure 2:
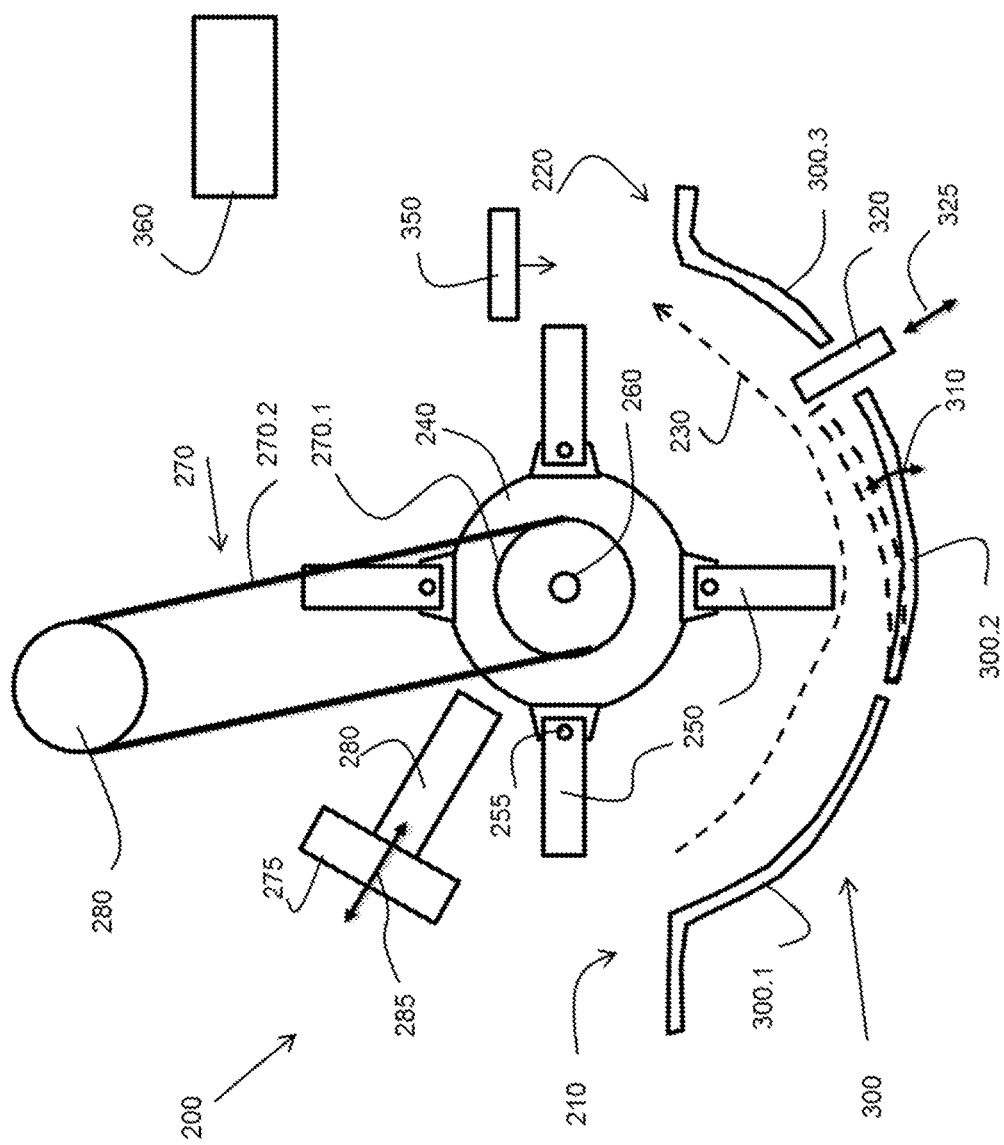
FIG. 2 depicts a cross-sectional view of a chopping mechanism as can be applied in an agricultural harvester according to the present invention.

FIG. 2 schematically shows a cross-sectional view of a chopping assembly 200 as can be applied in a combine harvester according to the present invention.

The chopping assembly 200 as schematically shown comprises an inlet 210 configured to receive a flow of crop residue, e.g. straw, and an outlet 220 through which the chopped crop residue is outputted onto the field. In the embodiment as shown, the flow of crop residue follows a trajectory 230 along which the crop residue is processed. In the embodiment as shown, the processing of the crop residue may be performed by the co-operation of various components of the chopping assembly 200. In particular, the chopping assembly 200 comprise a rotor 240 provided with a plurality of cutting tools 250 that are mounted along the circumference of the rotor 240. These cutting tools 250 may e.g. comprise knives or blades. The cutting tools may either be rigidly mounted to the rotor 240 or, as shown in FIG. 2, may be free to rotate about an axis 255 substantially parallel to the rotor axis 260. In the embodiment as shown, the rotor 240 is driven by a drive assembly 270 comprising a pulley 270.1 and a belt 270.2 arranged between the pulley 270.1 and a rotary shaft 280 of a central drive unit of the harvester to which the chopping assembly 200 is mounted. In accordance with the present invention, the drive assembly 270 can be controlled, thereby controlling a rotation speed of the rotor. By controlling the rotational speed of the rotor, a geometric parameter of the chopped crop residue, in particular, the length of the chopped crop residue can be controlled. In an embodiment, the drive assemble 270 may e.g. be a variable speed drive (VSD), e.g. including a variator or a CVT (continuously variable transmission). Such a drive may e.g. include a variable diameter pulley to adjust the rotational speed of the rotor 240 while maintaining the rotational speed of the shaft 280 of the central drive unit substantially constant.

In the embodiment as shown, other measures are schematically shown which may also contribute to the control of the geometric parameter of the chopped crop residue.

In the embodiment as shown, the chopping assembly 200 further comprises a cutter bar 275 provided with a plurality of so-called counter-knives 280. In an embodiment, a position of the cutter bar 270 and the counter-knives can be made adjustable, either by a manual operation, or by means of an actuator. In particular, the cutter bar 275 and counter-knives 280 may be displaced relative to the rotor 240, e.g. along a direction indicated by the arrow 285. By doing so, a length of the chopped crop residue as outputted via the outlet 220 may be influenced. By adjusting the distance between the cutter bar 270 and the rotor 240, the co-operation between the cutting tools 250 and the counter-knives is modified, resulting in a modified length of the chopped crop residue.

In particular, in case the counter-knives are brought closer to the rotor 240, they engage to a larger extent with the cutting tools 250, resulting in an increased interaction with the crop residue and thus resulting in a reduction of the length of the chopped crop residue. In order to displace the cutter bar 270 and counter-knives, an actuator such as an hydraulic, pneumatic or electromagnetic actuator 290 may be provided.

In the embodiment as shown, the chopping assembly 200 further comprises a guiding plate or surface 300 configured to guide the flow of crop residue along the trajectory 230. In the embodiment as shown, the guiding plate 300 comprises a plurality of segments 300.1, 300.2 and 300.3. As schematically indicated, the second segment 300.2 is configured to be displaceable (indicated by the arrow 310) relative to the rotor 240. This can e.g. be realized by a manual operation or can be automated, e.g. by means of an actuator. By adjusting the position of the segment 300.2, which can e.g. be realized as a concave plate, the distance between the guiding plate 300 and the cutting tools 250 is adjusted, resulting in an adjustment of the length of the chopped crop residue.

The embodiment of FIG. 2 shows a further measure that can affect the length of the chopped crop residue. FIG. 2 schematically shows a bar 320 which protrudes the guiding surface 300 and which may act as an obstruction to the flow of crop residue. In the arrangement as shown, the bar, which may also be referred to as a shred bar, is arranged between the second segment 300.2 and the third segment 300.3 of the guiding plate 300. By making the position of the shred bar 320 relative to the rotor 240 adjustable, i.e. enabling a displacement of the shred bar in the direction as indicate by the arrow 325, yet another measure is provided that enables to modify the geometry, in particular the length of the chopped crop residue. The adjustment of the position of the shred bar may either be realized in a manual manner or by means of an actuator.

Summarizing, in the embodiment as shown, four measures are schematically depicted that may be used to modify the length of the chopped crop residue, in particular the length of the chopped crop residue:

a variable rotational speed of the rotor provided with the cutting tools;
a positional adjustment of the cutter bar with counter-knives;
a positional adjustment of a segment of a guiding plate guiding the flow of crop residue; and
a positional adjustment of a shred bar arranged along the trajectory of the flow of crop residue.

In accordance with the present invention, the agricultural harvester to which the chopping assembly is mounted is further provided with an image based sensor 350. In accordance with the present invention, the image based sensor is configured to monitor the chopped crop residue. As such, the image based sensor may e.g. be mounted at or near the outlet of the chopped assembly, as e.g. shown in FIG. 2. Alternatively, the sensor may e.g. be mounted to a ramp that is connected to the outlet of the chopping assembly. More details on the image based sensor are provided below. In an embodiment, the image based sensor 350 is configured to generate a signal (e.g. comprising a one-dimensional or two-dimensional image or the chopped crop residue) while monitoring the chopped crop residue and provide the signal to a processing unit 360.

In an embodiment, an additional image based sensor may be mounted to the inlet of the chopping assembly, providing a signal representative of a geometric parameter of a geometry of the crop residue prior to the chopping operation.

In such an embodiment, both the signal of the image based sensor configured to monitor the chopped crop residue and the signal of the additional image based sensor may be provided to the processing unit and applied by the processing unit to determine a control signal for the drive assembly.

FIG. 3 schematically depicts two possible embodiments of an image based sensor as can be applied in the present invention. Within the meaning of the present invention, it should be noted that an image based sensor need not be limited to a sensor capturing an image in the visual light spectrum. Rather, UV or IR-based image sensors may be considered as well in the present invention.

In the first embodiment, the image based sensor comprises a linear CCD array 350.1 configured to capture an image of at least part of the chopped crop residue as processed by the chopping assembly.

Such a linear CCD array may be configured to span a substantial part of the width of the outlet of the chopping assembly. In the embodiment as shown, the image as captured (e.g. a one-dimensional image) is provided to a processing unit 360. This can e.g. be realized by providing an image signal, representing the image as captured, from an output terminal 380.1 of the image based sensor 350.1 to an input terminal 390 of the processing unit 360. Connection 370 schematically indicates the communication channel between the image based sensor 350 and the processing unit 360. In order to provide the image signal to the processing unit, different modes of communication may be suited, both wired modes of communication and wireless modes of communication. In case a linear CCD array is used, the processing unit may be configured to receive a sequence of such one-dimensional images and assemble them into a two-dimensional image.

In a second embodiment, the image based sensor 350.2 may be configured to generate a two-dimensional image of the chopped crop residue and provide it to the processing unit, via an output terminal 380.2 of the sensor. In this respect it can be noted that such a two-dimensional image can be generated as a single shot (which is typically for CCD-based camera's, using a global shutter), or by means of a so-called rolling shutter whereby a two-dimensional image is not captured in by taking an image of the entire object of interest at single instant in time but rather by scanning across the object of interest rapidly. The latter approach is often applied in CMOS technology based camera's. In order to generate a sharp image of a crop flow with a speed of up to 50 m/s without using expensive high speed camera's, an intelligent illumination strategy is needed: By pulsing the illumination (LED's) very shortly within the integration time of the sensor, a sharp image can be generated and LED's can safely be boosted up to many times their rated current.

Once the processing unit 360 has received or assembled a two-dimensional image of the chopped crop residual, it may apply pattern or feature recognition algorithms to derive a geometric parameter of the chopped crop residue. Such algorithms may involve detection of edges of structures found in the image. In order to facilitate the detection of edges of the different structures, contrast enhancement algorithms may be applied. Alternatively or in addition, the image based sensor may be equipped with focussing optics with a comparatively small focal depth, to focus on a particular layer of the chopped crop residue. It may further be advantageous to provide the image based sensor with an adjustable illumination source to illuminate the object of interest. Such an illumination source may e.g. be configured to emit illumination having different bandwidths and/or intensities.

In an embodiment, it may be advantageous to provide in a bi-directional communication between the processing unit and the image based sensor. By doing so, the processing unit may be configured to control one or more operational parameters of the image based sensor, in order to facilitate the deriving of the geometric parameter of the chopped crop residue based on the captured image or images. Examples of such operating parameters may e.g. involve, when available, illumination settings of a light source of the image based sensor, shutter speed, settings of focussing optics, etc.

As a result of the processing of the image or images, a geometric parameter of the chopped crop residue may be obtained. In particular, a length, an average length or a length distribution of the chopped crop residue may be determined or estimated. Upon comparison of the determined geometric parameter with a desired value or range, the processing unit of the combine harvester according to the present invention is configured to determine a control signal for the drive assembly that drives the rotor with the cutting tools. In particular, the control signal may include a speed control signal for controlling a rotational speed of the rotor of the drive assembly. It has been observed that the rotational speed of the rotor of the chopping assembly has an important impact on the size of the chopped crop residual. As such, the size of the chopped crop residual may be controlled by controlling the rotational speed of the rotor of the chopping assembly.

Referring to FIG. 2, it can be noted that a position of either the counter knives, the shred bar or the guiding plate (or a part thereof) may also affect the size (e.g. the average length) of the chopped crop residue. In an embodiment of the present invention, one or more of these components may be positionable or displaceable by means of one or more actuators, whereby these one or more actuators can be controlled by means of one or more further control signals that are generated by processing unit, based on the geometric parameter of the chopped crop residue as determined from the signal received from the image based sensor.

As a first example, the chopping assembly may comprise a shred bar actuator for displacing the shred bar, the processing unit being configured to determine a control signal for controlling a position the shred bar actuator, based on the geometric parameter.

As a second example, the chopping assembly may comprise a guiding member actuator for displacing part of the guiding plate, the processing unit being configured to determine a control signal for controlling the guiding member actuator, based on the geometric parameter.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. An agricultural harvester for harvesting a crop on a field, the harvester comprising:
    a chopping assembly configured to chop a crop residue of the harvested crop, the chopping assembly comprising:
        an inlet for receiving the crop residue;
        a rotor comprising one or more cutting tools and configured to chop the crop residue;
        a drive assembly configured to drive the rotor;
        an outlet for outputting the chopped crop residue onto the field; and
    an image based sensor configured to generate a signal comprising an image of the chopped crop residue;
    a processing unit configured to:
        receive the signal from the image based sensor;
        process the signal to derive a geometric parameter of a geometry of the chopped crop residue; and
        determine a control signal for the drive assembly based on the geometric parameter.

2. The agricultural harvester according to claim 1, wherein the image based sensor comprises a CCD or CMOS camera.

3. The agricultural harvester according to claim 1, wherein the image based sensor is a linear CCD or COMS camera mounted to the outlet.

4. The agricultural harvester according to claim 3, wherein the linear CCD or CMOS camera extends over a width of the outlet of the chopping assembly.

5. The agricultural harvester according to claim 1, further comprising a further image sensor mounted to the inlet of the chopping assembly, the further image sensor being configured to provide a further signal comprising an image of the crop residue at the inlet.

6. The agricultural harvester according to claim 5, wherein the processing unit is further configured to receive the further signal and process the further signal to derive a further geometric parameter therefrom, wherein the processing unit is configured to determine the control signal for the drive assembly based further on the further geometric parameter.

7. The agricultural harvester according to claim 1, wherein the processing unit is configured to determine the control signal for the drive assembly by applying a pattern recognition algorithm to the signal to derive the geometric parameter.

8. The agricultural harvester according to claim 1, wherein the processing unit is configured to determine the control signal for the drive assembly by applying a shape recognition algorithm to the signal to derive the geometric parameter.

9. The agricultural harvester according to claim 1, wherein the geometric parameter is a length or length distribution of the chopped crop residue.

10. The agricultural harvester according to claim 1, wherein the geometric parameter is a percentage of splitted stems of the chopped crop residue.

11. The agricultural harvester according to claim 1, wherein the control signal comprises a speed control command for the drive assembly to control a rotary speed of the rotor of the chopping assembly.

12. The agricultural harvester according to claim 1, wherein the chopping assembly further comprises a guiding surface for guiding the crop residue during the chopping by the rotor.

13. The agricultural harvester according to claim 12, wherein the guiding surface comprises a guiding member that is at least partly displaceable relative to a rotary axis of the rotor.

14. The agricultural harvester according to claim 13, wherein the guiding member comprises a concave plate.

15. The agricultural harvester according to claim 13, wherein the chopping assembly further comprises a guiding member actuator for displacing the guiding member, and wherein the processing unit is further configured to determine a second control signal for the guiding member actuator based on the geometric parameter.

16. The agricultural harvester according to claim 1, wherein the chopping assembly further comprises a shred bar substantially extending along a width of the chopping assembly, the shred bar being displaceable relative to the rotor.

17. The agricultural harvester according to claim 16, wherein the chopping assembly further comprises a shred bar actuator for displacing the shred bar, and wherein the processing unit is further configured to determine a third control signal for the shred bar actuator based on the geometric parameter.

18. The agricultural harvester according to claim 1, further comprising a bi-directional communication link between the image based sensor and the processing unit, the processing unit being configured to provide a sensor control signal to the image based sensor for controlling an operating parameter of the image based sensor.

19. The agricultural harvester according to claim 1, further comprising a power sensor for sensing a power consumption of the drive assembly, the power sensor being configured to provide a power signal to the processing unit.

20. The agricultural harvester according to claim 19, wherein the processing unit is configured to determine the control signal further based on the power signal.

* * * * *